Oct. 15, 1968  D. A. RICHARDSON ET AL  3,405,468

SIGNS

Filed March 28, 1966

Inventors
Donald A. Richardson
John R. Waters
By
Morrison, Kennedy & Campbell
Attorneys

3,405,468
SIGNS

Donald Arthur Richardson, St. Helens, and John Robert Waters, Ormskirk, England, assignors to Pilkington Brothers Limited, Liverpool, England, a corporation of Great Britain
Filed Mar. 28, 1966, Ser. No. 537,955
Claims priority, application Great Britain, Mar. 30, 1965, 13,515/65
7 Claims. (Cl. 40—130)

ABSTRACT OF THE DISCLOSURE

An illuminated warning sign providing a controlled bright and clear pattern of light-delineating areas formed by an illuminating means individual to each of a plurality of plano-convex lenses.

---

Figure 1:
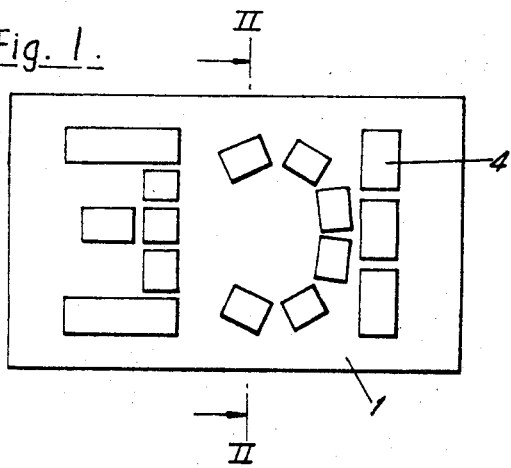

This invention relates to signs and in particular to illuminable signs, for example, road signs.

There is a need for illuminated road signs which are visible from a considerable distance, for example 500 to 1000 yards, on modern fast roads. Such signs are required for many purposes such as for giving warning to vehicle drivers of dangers or weather conditions ahead such as accidents, fog or ice, also for direction signs, speed limit signs where the speed limit may be altered at times when heavy traffic is expected, and for cross-roads traffic lights.

It is a main object of the present invention to provide an improved illuminable sign which is clearly visible from a considerable distance.

According to the invention there is provided an illuminable sign comprising a plurality of optical focussing elements arranged in a pattern delineating information to be conveyed by the sign, means located in the region of the focal plane of said elements for illuminating the elements so that they radiate a bright pattern of light, and means located in the light path for imparting a desired beam spread to the pattern of light emergent from the sign.

The optical focussing elements may be a system of focussing mirrors which are illuminated by light sources located in the region of the focii of the mirrors so that a bright pattern of substantially parallel light delineating the sign is reflected from the mirrors. A regular pattern may be formed on the reflecting faces of the mirrors in order to give the desired beam spread to the light emergent from the sign.

Further according to the invention an illuminable sign comprises a plurality of optical focussing elements arranged in a pattern delineating information to be conveyed by the sign, means located in the region of the focal plane of said elements for illuminating the elements so that a bright pattern of substantially parallel light emanates therefrom, and means located in the path of said substantially parallel light for imparting a desired beam spread to the pattern of light emergent from the sign.

Alternatively, and in a preferred embodiment of the invention the optical focussing elements are a system of convex lenses, and from this aspect the invention provides an illuminable sign comprising a light transmitting sheet, a plurality of convex lenses arranged at the rear face of the sheet, and means located in the region of the focal plane of the lenses for illuminating the lenses so that a desired bright pattern of light delineating the information to be conveyed by the sign is radiated from the front of the sheet, at least one surface in the sign having a formation which gives a desired beam spread to the emergent light.

Preferably the light transmitting sheet has a surface formation which gives a desired beam spread to light emergent from the sheet.

Although a sign according to the invention is specially adapted for use as an illuminated road sign, it could be adapted for many other uses, for example as a display or advertising sign or as an illuminated railway sign.

In a preferred embodiment of the invention a plurality of plano-convex lenses are stuck to the rear face of the sheet in the desired pattern, and a light source is arranged behind each lens in the region of the focus of the lens. The desired pattern of plano-convex lenses may be moulded integrally with the transparent sheet which is preferably a glass sheet. Other suitable transparent materials may be used, for example transparent acrylic resin materials.

The pattern of lenses may be arranged according to the invention to form a word, e.g., SLOW, ICE, FOG, ACCIDENT, a number, or a symbol.

In another embodiment of the invention a plurality of plano-convex lenses are stuck to the rear face of the sheet in adjacent rows, a light source is arranged behind each lens in the region of the focus of the lens, and selective switching means connects the light sources to a power supply and is operable to energise the light sources selectively so that there is produced a desired bright pattern delineating the information to be conveyed by the sign.

Tungsten filament bulbs may be used as the light sources, or alternatively fluorescent tubes may be employed with a screen positioned between the tubes and the lenses, there being a hole in the screen behind each lens. Tube shaped lamps may be used without screens in large signs where one semicylindrical lens takes the place of several square or round lenses arranged side-by-side. The tubular lamp is arranged parallel to the semicylindrical lens in the focal plane of the lens. The light emerges from the lenses as parallel light, or substantially so, and the beam spread must be controlled so that the whole of the bright pattern is visible to an observer close to the sign and the information to be conveyed by the sign is also legible from a considerable distance.

When a sign according to the invention is placed at the side of a long straight section of a road, the sign is inclined at a very small angle to the road so that it is visible to an approaching driver for the maximum possible distance.

Preferably according to the invention the front face of the sheet is rough-cast to give the desired beam spread to the bright pattern emerging from the front face of the sheet.

Alternatively according to the invention one face of the sheet may be formed with a regularly disposed array of small beam-spreading lenses to give the desired beam spread to the bright pattern of light emerging from the front face of the sheet.

An illuminable road sign must be non-reflecting so that at night it does not have the appearance of being illuminated when struck by light from a vehicle's headlamps.

From this aspect of the invention the light transmitting sheets forms the front wall of a compartment enclosing the light sources, which compartment has a blackened interior so that light reflection from the signal is minimal.

The plano-convex lenses may be stuck to the flat rear face of the glass sheet or may be moulded integrally with the glass sheet.

There may also be provided according to the invention, means for causing relative periodic movement between the transparent sheet and the light incident on the sheet, whereby periodic flashing of the emergent bright pattern of lights is produced. Alternatively the sign may be flashed periodically by means of a master switch in the electric circuit supplying the light sources.

It is also desired to provide means for electrically heating the front sheet of the sign in order to prevent it from becoming obliterated by snow, and further according to the invention the light transmitting sheet may be a sheet of laminated glass embodying electrical heating means. For example electrical heating wires may be embodied in the laminate, or one component of the laminate may be provided with an electrically conductive heating film.

The invention also comprehends a transparent sheet of glass, for use in an illuminable sign of the kind set out above, whose rear face comprises a plurality of convex lenses arranged in a pattern to delineate the information to be conveyed by the sign.

The light emergent from the sign may be either white or coloured or in the form of a multicoloured pattern. Coloured light can be produced either by the use of a coloured lamp or lamps or by the insertion of a colour filter or filters between the lamps and the lenses.

Figure 2:
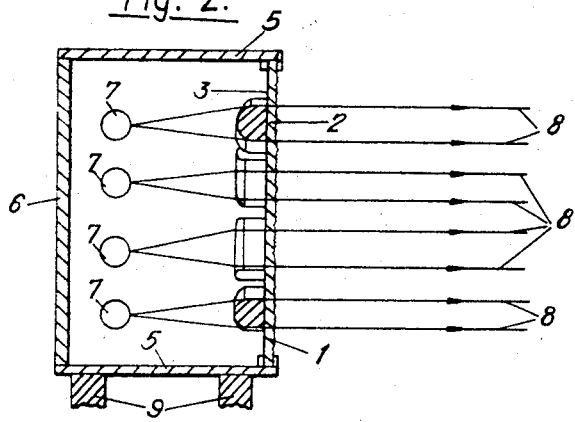
Figure 3:
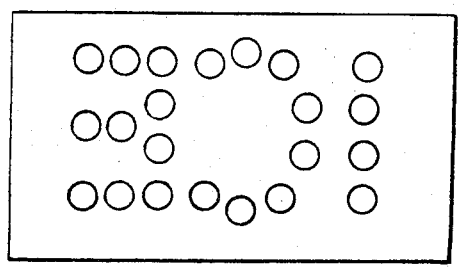

In order that the invention may be more clearly understood some embodiments thereof will now be described, by way of example, with reference to the accompanying drawings, in which:

FIGURE 1 is an elevation of the rear face of a transparent sheet forming part of an illuminable sign according to the invention, FIGURE 2 is a section on line II—II of FIGURE 1, also showing the sheet in position as the front wall of a compartment enclosing means for illuminating the sheet, and FIGURE 3 is a view similar to FIGURE 1 showing a different disposition of lenses on the rear face of the sheet.

Referring to FIGURES 1 and 2 of the drawings an illuminable road sign is shown which comprises a sheet 1 of transparent material, e.g., glass or an acrylic resin material, which has a rough-cast front face 2, which is a light-diffusing front face and controls the beam spread of light emerging from the sign. The rear face 3 of the sheet 1 is flat and a plurality of plano-convex lenses 4 are stuck to this flat face 3 in a desired pattern such as the pattern shown in the drawings which forms the word ICE. In this embodiment the lenses 4 are moulded glass lenses and the plane faces of the lenss are stuck to the flat rear face of the glass sheet with a transparent adhesive, for example a transparent thermosetting resin adhesive.

The transparent sheet 1 forms the front wall of a compartment further comprising side walls 5 and a rear wall 6. Several light bulbs 7, one for each lens, are mounted in the compartment in the region of the focal plane of the lenses 4 so that light from the bulbs 7 incident on the lenses 4 emerges from the front of the sign as a pattern of bright light 8 delineating the word ICE which light has a beam spread produced by the rough-cast front face 2 of the glass sheet.

When the sign is supported on legs 9 at the side of a stretch of straight road in such a way that the emergent light pattern is directed down the road, the sign is visible from a considerable distance, for example 500 yards to 1000 yards.

Preferably the inside surfaces of the walls 5 and 6 are blackened so that there is no reflection inside the compartment of any light incident on the sign from headlamps of vehicles. The sign will thus not be rendered visible by reflected light during the hours of darkness.

A bright output is necessary from the sign during daylight and the lamps used in the sign must be sufficiently bright to ensure the desired visibility of the sign in bright sunlight. Means may be provided in the switching circuit supplying power to the sign for dimming the sign at night when the maximum light output necessary is lower.

A number of different signs may be mounted together as a unit positioned at the side of the road, the illumination of each sign being individually controlled from a remote control station. It is envisaged that signs according to the invention would be positioned at regular intervals along both sides of a motorway and would be illuminated as appropriate from a central control station thus providing a warning service for drivers along the whole length of the motorway.

The letters or other parts of a sign according to the invention may be integrally formed with a plane surface and a convex surface and then stuck on to the rear face 2 of the sheet 1. The lenses 4 shown in FIGURES 1 and 2 are of rectangular form, but if desired lenses of circular form may be employed as shown in FIGURE 3.

In another embodiment of the invention the lens surfaces are moulded integrally with the glass sheet 1 to delineate the desired word or symbol.

Also the lenses may be of a coloured glass while the sheet 1 is colourless. This is particularly advantageous in advertising and display signs according to the invention.

In another sign according to the invention the desired beam spread of the pattern of light emerging from the front face of the sheet may be produced by forming one face of the sheet with a regularly disposed array of small beam-spreading lenses. For example instead of being rough-cast the front face of the glass sheet may be formed with a regular pattern of "beads" of glass standing out from that face, or a pattern of small regular lenses may be moulded in the front face of the sheet.

Alternatively the rear face of the sheet 1 may be formed with a pattern of small concave areas so that when the plano-convex lenses 4 are stuck on to the rear face of the sheet 1 there are formed small beam-spreading lenses at the interface between the pattern forming lenses 4 and the rear face of the sheet 1.

In another arrangement either face of the lenses 4 may be formed with a pattern of small beam spreading lenses either protruding from the convex faces of the lenses 4 or in the form of small concave depressions in the plane faces of those lenses.

A versatile sign according to the invention may be formed by a mosaic of plano-convex lenses which are stuck to the rear face of the sheet 1 or formed integrally in the rear face of the sheet 1, in adjacent rows. A light source is arranged behind each lens in the region of the focus of the lens and all the light sources are connected to a power supply through selective switching means which may be located at a central control station. The light sources are wired up in different patterns, forming a number of circuits which are connected to the switching means in patterns, so that the light sources are energized selectively to produce one of a number of bright patterns each delineating information to be conveyed by the sign.

For example one circuit may connect all the light sources which delineate the word ICE, whereas another circuit would delineate the word FOG. Thus the same sign could be used to give a selective one of a number of different warnings. This selective energisation of the light sources may also be employed for changing the number indicated by the sign, for example when there is a change in the speed limit.

In order to prevent the sign from becoming obliterated by snow, the front sheet 1 of the sign may be a sheet of laminated glass with electrical heating wires embodied in the laminate. Alternatively one component of the laminate may be provided with an electrically conductive film, which provides electrical heating of the front of the sign.

A sign according to the invention may employ focussing mirrors as optical focussing elements in place of the convex lenses. For example small parabolic mirrors may be arranged in a pattern in the sign with a light source at the focus of each mirror. The desired beam spread of the light from each mirror may be achieved by forming a regular series of dimples or projections on the reflecting surface of each mirror.

In an advertising sign according to the invention there could be an automatic sequence of switching of a number of circuits, for example under control of a perforated tape, so that the sign would flash through a connected sequence of words and/or display patterns.

In some circumstances it is desirable for an illuminated sign to flash on and off in order to attract attention to the sign, and this may be achieved in a sign according to the invention by means of a periodically operated master switch in the supply circuit to the light sources or by including means for causing relative periodic movement between the lenses and the light incident on the sheet. Either the front sheet 1 may be reciprocated with the light sources fixed, or the light sources may be moved periodically into and out of the focal plane of the lens. Where the light sources are holes in a screen positioned in front of a number of fluorescent tubes then the screen could be reciprocated to produce a desired flashing effect.

We claim:

1. An illuminable sign comprising a light transmitting sheet, a plurality of plano-convex lenses arranged at the rear face of the sheet, and individual means located in the region of the focal plane of each lens for illuminating the lenses so that a desired controlled bright and clear pattern of light delineating the information to be conveyed by the sign is radiated from the front of the sheet, at least one surface in the sign having a formation which gives a desired beam spread to the emergent light.

2. A sign according to claim 1, wherein a plurality of plano-convex lenses are stuck to the rear face of the sheet in a desired pattern, and a light source is arranged behind each lens in the region of the focus of the lens.

3. A sign according to claim 1, wherein a plurality of plano-convex lenses are stuck to the rear face of the sheet in adjacent rows, a light source is arranged behind each lens in the region of the focus of the lens, and selective switching means connects the light sources to a power supply and is operable to energise the light sources selectively in order to produce the desired bright pattern delineating the information to be conveyed by the sign.

4. A sign according to claim 1, wherein the front face of the sheet is rough-cast to give the desired beam spread to the bright pattern emerging from the front face of the sheet.

5. A sign according to claim 1, wherein one face of the sheet is formed with a regularly disposed array of small beam-spreading lenses to give the desired beam spread to the bright pattern of light emerging from the front face of the sheet.

6. A sign according to claim 1, wherein the light transmitting sheet forms the front wall of a compartment enclosing the light sources, which compartment has a blackened interior so that light-reflection from the sign is minimal.

7. A sign according to claim 3, characterised by means for causing relative periodic movement between the transparent sheet and the light incident on the sheet, whereby periodic flashing of the emergent bright pattern of light is produced.

References Cited

UNITED STATES PATENTS

| | | | |
|---|---|---|---|
| 2,137,360 | 11/1938 | Spelsey | 40—130 |
| 2,168,223 | 8/1939 | Lauve | 40—133 |
| 2,230,152 | 1/1941 | Wolfrey | 40—130 |
| 2,269,325 | 1/1942 | Veitch | 40—133 |
| 2,289,904 | 7/1942 | Curtis | 40—133 |

EUGENE R. CAPOZIO, *Primary Examiner.*

W. J. CONTRERAS, *Assistant Examiner.*